June 4, 1963  L. D. ADAMS, JR  3,092,232
INFLATABLE ESCAPE SLIDE
Filed Dec. 8, 1961  2 Sheets-Sheet 1
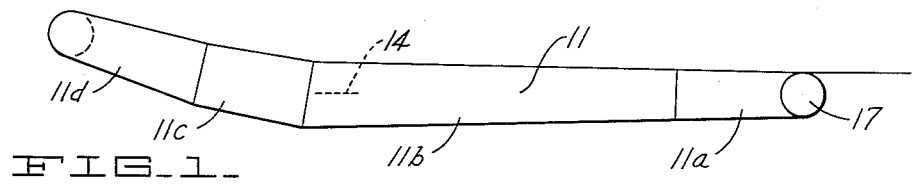
FIG_1_
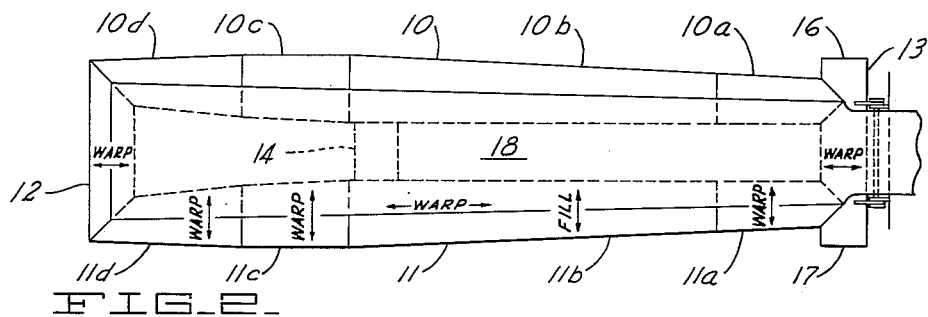
FIG_2_
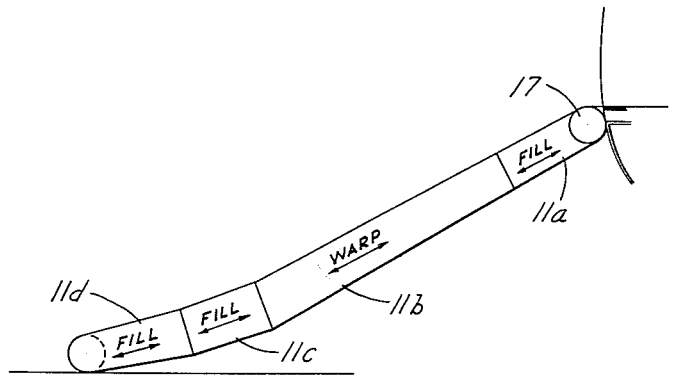
FIG_3_
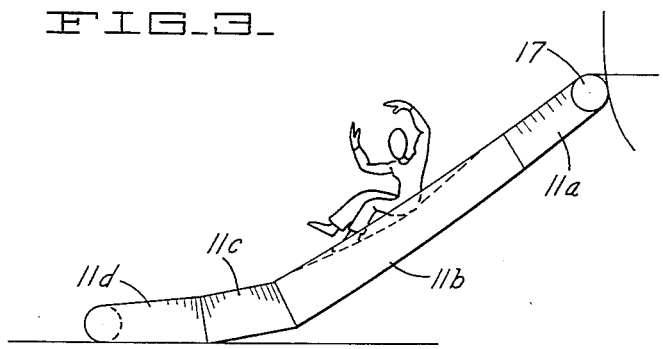
FIG_4_
INVENTOR.
Leland D. Adams, Jr.
BY
ATTORNEYS.

June 4, 1963 L. D. ADAMS, JR 3,092,232
INFLATABLE ESCAPE SLIDE
Filed Dec. 8, 1961 2 Sheets-Sheet 2
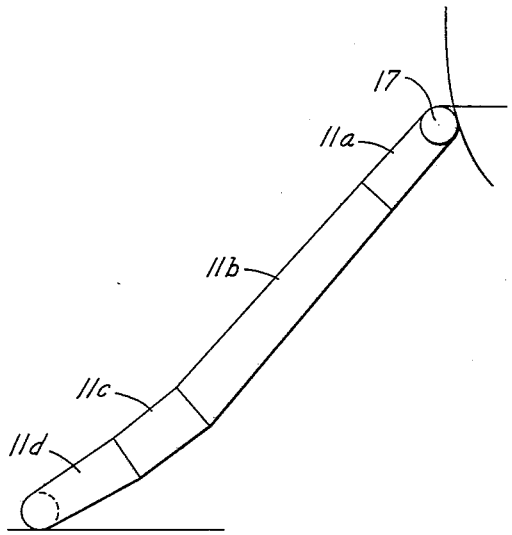
FIG_5_
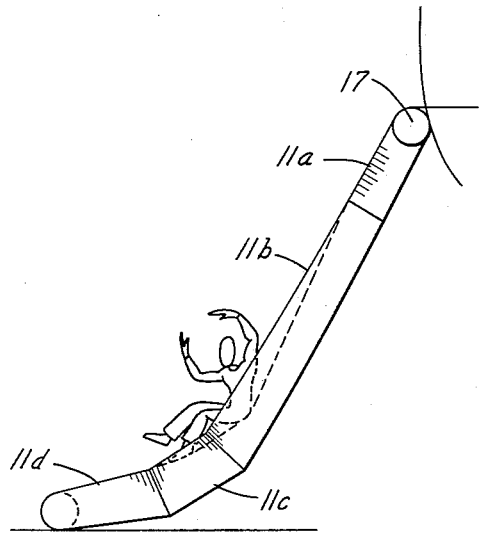
FIG_6_
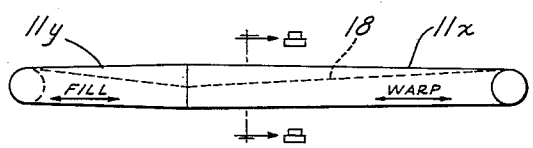
FIG_7_
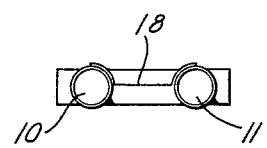
FIG_8_
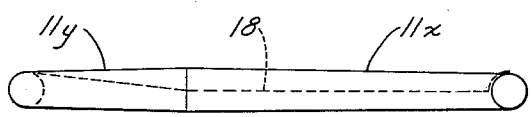
FIG_9_
INVENTOR.
Leland D. Adams, Jr.
BY
ATTORNEYS.

United States Patent Office 3,092,232
Patented June 4, 1963

1

3,092,232
INFLATABLE ESCAPE SLIDE
Leland D. Adams, Jr., Atherton, Calif., assignor to Survival Equipment Corporation, San Francisco, Calif., a corporation of New York
Filed Dec. 8, 1961, Ser. No. 157,990
4 Claims. (Cl. 193—25)

This invention relates to an improvement in inflatable escape slides, and particularly to such slides which are adapted to be used by persons escaping from an aircraft which has made a forced landing or encountered difficulties prior to takeoff. Under such conditions, conventional boarding ladders, etc. are not available and the escape apparatus must be available in the aircraft.

In such instances the aircraft will, in all probability, come to rest in an unconventional position. For example, in event of a collapse of one of the landing wheels, the plane will come to rest at an angle and some of the escape doors or hatches will be at a greater than normal distance from the ground. Passengers seeking to escape from the plane will, therefore, experience considerable difficulty and possible injury if they leave the craft by jumping from a door or hatch in the elevated part of the plane.

The height of the escape hatch or door from the ground will vary depending upon the type of plane and the character of the accident. For example, in certain aircraft presently in use, particularly the Boeing 707, Boeing 720, and the Douglas DC-8, the fore and aft doors are normally approximately 10 or 12 feet from the ground, respectively. However, in the event of a front wheel collapse, for example, the rear door of the DC-8 may be more than 17 feet from the ground and the front door may be only 7 feet from the ground. Since these aircraft carry in excess of 100 passengers and, further, since safety regulations require that all of the passengers must be removed in the shortest possible period of time, it is apparent that all doors and escape hatches, including those farthest from the ground, must be utilized with the result that each must be provided with an escape slide designed to operate efficiently at any height and at any angle. Since the height of the door from the ground will vary with the type of accident, each escape slide must be adapted to provide safe egress for the passengers when used at angles up to 55° and even greater. Numerous attempts have been made to provide a commercial inflatable escape slide of this character and fulfilling these requirements.

One manufacturer has followed the teachings of Boyle U.S. Letters Patent 2,765,131 which discloses an inflatable escape slide consisting of flexible wall fluid distensible slideway. The device is more particularly characterized by the fact that three inflatable parallel tubes, when distended by internal pressure, form a fluid truss beam having high resistance to bending strains.

Another commercial form of inflatable escape slide is disclosed in British Patent 805,696 and this device consists of a pair of fluid distensible side members which support between them a slideway of the fabric sheet type commented upon in the aforesaid Boyle U.S. Letters Patent.

In an object of this invention to provide an inflatable escape slide of the flexible fabric sheet type which is adapted to be supported by parallel-spaced inflatable tubular side supports and which is adapted to be used to effect the safe escape of a person regardless of the angle at which the slide is operated.

With slides of the fabric sheet type illustrated and disclosed in the aforementioned British patent, the side support members are adapted to "break" to retard the speed of descent of the escapee. However, as I have pointed out, escape slides must be capable of safe use at angles up to 55° and above. When the tubular side support members of that type of slide are inflated at a sufficiently low pressure to provide optimum escape conditions at a steep or fast angle, with the resultant proper "break," the slide is not adapted to be used successfully at a lesser or slow angle. The reason seems to be that when the device is inflated at a low pressure, it tends to operate properly; that is, to break, and then to reassume its normal position, for descent at a steep or fast angle, but when the angle is slow or in the order of less than 40° the device breaks but doesn't spring back or resume its normal position and it is frequently necessary that the escapee scramble off the end or over to the side of the slide. When the slide is inflated to a pressure at which it will not "break," it will operate properly only for use at slow angles of less than 40°.

Various attempts have been made to overcome this defect, among them, the construction illustrated in the aforementioned Hailstone application.

It is the object of this invention to provide a device which will be operable at substantially any angle at which the device may be called upon to function, that is, between 20° and 65°.

It is a further object of this invention to provide a device of this character which will "break" when operated at a steep or fast angle in order that the breaking effect will slow the speed of the descending escapee.

It is a further object of this invention to provide a device of this kind, a portion of which will remain rigid, regardless of the angle of descent with the result that even though the device "breaks" when used at a slow or lesser angle, the break will not effectively retard the descent of the passenger or the efficiency of the slide.

These and other objects and advantages of this invention will appear from the following specification taken in conjunction with the accompanying drawing in which:

FIGURE 1 is the side elevational view of an inflatable escape slide incorporating my invention.

FIGURE 2 is a plane view of the device illustrated in FIGURE 1.

FIGURE 3 is a side elevational view of the escape slide disclosed in FIGURES 1 and 2 illustrating the same positioned at a relatively slow angle of descent.

FIGURE 4 is an illustration of the device illustrated in FIGURE 3 with an escapee thereon and illustrating the point of "break."

FIGURE 5 is an illustration of the device disclosed in FIGURES 1 and 2 and illustrating the same positioned at a relatively fast angle of descent.

FIGURE 6 is an illustration of the device illustrated generally in FIGURES 1 through 6 and differs therefrom primarily in that the inflatable side support members, although tapered, are not canted upwardly at their lower ends but are straight throughout their longitudinal axes and further that the deformable slide member is secured to the side support members in a different manner.

FIGURE 7 is another modification of the device disclosed.

FIGURE 8 is a cross-sectional view taken along the line 8—8 of FIGURE 7.

FIGURE 9 is a modification of the device illustrated in FIGURE 7 and differs therefrom in that the upper intended end of the slide member lies in a plane defined by the longitudinal axes of the inflatable side support members.

As illustrated in the drawings, my device consists of a pair of tubular inflatable side members 10 and 11 which may be formed of fabric impregnated with rubber or other flexible impervious material. The ends of the side support members 10 and 11 are spaced or separated by a pair of end members 12 and 13 which are likewise tubular and inflatable and which are formed of the same impregnated fabric and which are in fluid communication with the side members 10 and 11. A tubular, inflatable, intermediate transverse member 14 is positioned between the two side members 10 and 11 and parallel to the end members 12 and 13 at a point about ⅓ of the distance between the lower end member 12 and the upper end member 13. The side, end, and intermediate members are in fluid communication with the result that the pressure in each is identical.

The side support members 10 and 11 are tapered from their upper and lower end to a point at about the point where the intermediate transverse member 14 space the two. More specifically, and in the preferred embodiment illustrated in FIGURE 2, for example, the side members 10 and 11 consists of upper tubular portions 10a and 11a, intermediate portions 10b and 11b, two lower portions 10c and 11c and 10d and 11d, respectively. All portions are formed of fabric in tubular form and are cemented at their adjacent or adjoining ends to form a leakproof seal between them.

The lower end member 12 is adapted to engage the ground. It will be noted from FIGURE 1 that the lower end and particularly the portion of the side wall 10 and 11, consisting of the lower end portions 10c and 11c and 10d and 11d, are normally offset upwardly with respect to the longitudinal axis of the members 10 and 11 as exemplified by sections 10a and 11a and 10b and, as viewed in FIGURE 1, if the plane defined by the top edges of the sections 10a and 10b were projected through the offset, the plane would pass below the lower edge of transverse member 12.

The upper end support member 13 is adapted to be supported adjacent and escape door or hatch in the plane and to engage the side of the fuselage of the aircrafts at a point immediately below the door or opening on the outside of the plane. It will be noted that the member 13 is provided with a pair of normally outwardly projecting side extensions 16 and 17 which are likewise in fluid communication with the member 13 so they are inflated simultaneously therewith and to the same pressure.

The side support members 10 and 11 and the end support members 12 and 13 support a flexible sheet portion 18 which is secured to the members 10, 11, 12, and 13 in any suitable manner, as, for example, by the use of an adhesive.

The slide member 18 comprises a deformable fabric sheet. It will be observed from the drawing that the sheet 18 is secured to the side walls 10 and 11 and the end walls 12 and 13 in such a manner that the slideway which is created thereby is relatively flat in those areas defined generally by the side wall portions 10a and 11a and 10c and 11c and 10d and 11d. It will also be apparent that the slide member 18 tends to sag in the zone between the just described flat areas and that the area of greatest sag is generally near the lower ends of the side wall sections 10b and 11b. The purpose of the sag in the slide member 18 will be more fully hereinafter described.

The entire apparatus is adapted to be secured to the aircraft by any suitable means and including an extension of the slideway fabric 18. The art of securing an escape slide to the aircraft is well-known and need not be described in detail here.

My inflatable escape slide is constructed in such a manner that the sections of the side walls defined by the areas 10a and 11a, 10c and 11c, and 10d and 11d tend to deform longitudinally whereas the section of the side walls defined generally by the portions 10b and 11b do not deform longitudinally. I control the direction of deformation by controlling the lay of the material from which the side members are formed.

For example, to create a tubular member which will remain rigid and not tend to deform, I lay the warp longitudinally and the fill circumferentially or laterally about the periphery of the tubular member as indicated generally by the arrows and the legends in FIGURE 2. To provide a non-deformable portion to the members 10 and 11, I form the portions 10b and 11b by laying the warp longitudinally and the fill circumferentially about the periphery of the tube thus formed. In order to provide deformability to the upper and lower ends of the slide I form the upper and lower portions 10a and 11a, 10c and 11c, and 10d and 11d by laying the fill longitudinally and the warp circumferentially.

The warp is generally the threads which are extended lengthwise in the loom during the weaving process and which are crossed by the woof or filling threads. The warp is usually stouter and harder twisted.

At any rate, in the material of which this slide is customarily made, which is woven fabric impregnated with a rubber or other sealing material, the elongation of the warp is preferably of the order of ½ of 1%, or less, while the stretch or elongation in the fill direction may exceed this by several times.

As is also well known, when a woven fabric cut is to an irregular pattern in which the side edges are not parallel, a so-called "bias" is formed. It will be apparent that when the portions of the fabric which form the side walls and are formed and sealed to provide tubular members and when the tubes thus formed are joined at their adjacent edges, that this bias may be carried over into the device ultimately produced. To overcome this tendency and to equalize the effect of the bias, I form the tubular members in such a way that opposite portions and adjacent portions possess different bias. Therefore, for example, in section 10a the bias will be right hand whereas in section 11a the bias will be left hand; in section 10c the bias is right hand, and in section 11c bias is left hand; in section 10d the bias is left hand and in 11d the bias is right hand. The two portions forming the end member 11 are made of tubular portions thereof are right and left hand bias. The two portions forming the upper cross member 13 are also of left and right hand bias.

It is apparent therefore that when the slide is formed in the manner described, the bias effect of adjacent and opposite portions will tend to cancel each other with the result that the slide as ultimately formed will not tend to warp or be subject to the biasing effect created by the cut of the fabric.

It will be apparent from the foregoing, therefore, that I have formed an inflatable escape slide whose side walls are formed in such a manner that any biasing effect in the cut of the cloth is overcome. In addition, the end portions 10a and 11a, 10c and 11c and 10d and 11d are less rigid and, therefore, tend to deform along their longitudinal axes. The more rigid portions 10d and 11d, because of the lay of the material, tends to maintain their rigidity about their longitudinal axes.

The effect of this construction may generally be described as follows.

When the slide is used at a fast angle in excess of 45°, for example, as illustrated in FIGURES 5 and 6, the escapee leaving the escape hatch drops onto the fabric surface 18 at a point in the area defined generally by the side walls portions 10a and 11a. This portion of the slide area is relatively flat with the result that the escapee tends to pass rapidly through this zone. The resiliency of the side wall portions 10a and 11a, however, permits a partial absorption of the shock of the escapee landing upon the area 18 at that point. The escapee then passes into that area of the slide surface 18 which sags and which is defined generally by the side wall areas 10b and 11b which, it will be recalled, are relatively rigid. Therefore the escapee passes quickly into this area and the sag effect of the slide surface 18 tends to slow him down and retard his passage along the slide. The lower portion of the slide, defined by the remaining side support members 10c and 11c and 10d and 11d, is more susceptible to deformation and tends to deform under the weight of the escapee more or less generally throughout its entire length with the result that his slide is softened and ultimately terminated in a deformed area. When the weight of the escapee is removed from the slide, the inherent resiliency in the side wall members 10 and 11 causes it to return to its normal position.

When the slide chute is used at a slow angle of less than 45°, for example, the escapee engages the slide area 18 in the same manner. His slide, however, is less rapid than previously described. The lower end of the slide may deform but the area defined by the side wall portions 10b and 11b will remain rigid. Even assuming that the lower end of the slide may readily deform in which event it might, under extreme conditions, engage the ground along the entire length of sections 10c and 10d, the escapee will have been able to have escaped from the escape hatch area. The rigidity of the portion of the slide defined by the side wall portions 10b and 10c prevents the overall "hammock" effect found in prior escape slides when used at a slow angle. The longitudinal axis being offset upward at a point about ⅓ the slide length from the lower end causes a change on acceleration or g force proportional to the speed of the escapee. The faster his motion the greater slide deformation force is created which in turn deforms the slide in a manner that will cause the escapee to decelerate rapidly before reaching the end of the slide. Conversely during a descent at a low angle, the slide is not deformed to the degree that higher escapee speeds cause and hence permit the escapee to quickly reach the slide end despite the relatively low velocity generated by the low slide angle.

As has previously been pointed out, inflatable escape slides made in accordance with the disclosure of the Boyle patent are rigid throughout their entire length. When used at a slow angle the escapee slides along the rigid beam with little or no ill effect. However, when the device is used at a fast or steep angle, the escapee slides at a rapid rate and there is nothing about the slide tending to slow his escape. When such devices have been used at a steep or fast angle, the escapee has, at times, suffered injury by virtue of this rapid descent and his rapid discharge off the free end of the slide.

Devices of the type manufactured in accordance with the aforementioned British patent have been satisfactory when used at a steep or fast angle since the sag in the slide tends to pocket or to hold the escapee and prevent his rapid ejection. However, when this slide is used at a slow or less steep angle, it tends to "hammock" or sag along its entire length.

My escape slide, however, is adapted to be used at either a slow or fast angle.

For example, when it is used at a fast angle, it provides the pocket or slowing effect desired in such use. In addition, the device possesses a so-called "leaf spring" effect which tends to return it to its normal position even while the escapee is on it. At any rate it will always return to its normal position when the weigth of the escapee is removed. This "leaf spring" effect tends to assist the escapee in removing himself from the slide so that it is ready for the next user.

When the slide is used at a slow or less steep angle, the rigidity of the side wall portions 10b and 11b prevent the "hammock" effect previously described and serves to remove the escapee from the area of the escape hatch rapidly.

Thus it will be seen that I have been able to combine, in a single slide, a device which is satisfactory for the removal of an escapee from a disabled airplane whether the escape hatch which he is using is at a substantial height from the ground or is relatively near to the ground.

The devices illustrated in FIGURES 7, 8, and 9 differ from those previously described in two particulars. In the first place it will be noted that the tubular side supporting members are formed so that their longitudinal axes are straight and that the lower end or foot is not canted upwardly as indicated in FIGURE 1, for example.

In addition, it will be recalled that in connection with the description of the device illustrated in FIGURE 1, it was pointed out that the slide area 18 was secured to the upper edges of the side walls 10 and 11. In the device illustrated in FIGURE 7 the fabric of the slideway 18 is secured to the side wall members generally along the dotted line as illustrated in FIGURE 7. It will be noted that in the normally intended upper end of the slide, the slide surface 18 is secured to the members 10 and 11 at their points of nearest approach or, in a plane defined by the two longitudinal axes of the members 10 and 11. The slideway member 18, however, in the normally intended lower end of the slide is secured to the side wall members 10 and 11 generally along the dotted line illustrated in FIGURE 7. It will be seen therefore that the general path of the slide 18, in the modification illustrated in FIGURES 7 and 8, generally follows the pattern of the slideway 18 in the device illustrated in FIGURES 1 through 6, inclusive. In this manner I am able to provide a slide which possess the "break" feature of the device illustrated in FIGURES 1 through 6, inclusive. In addition the side support members 10 and 11 form "sides" for the member 18 tending to prevent the escapee from falling from one side or the other of the device. Those portions of the side support members 10 and 11 forming the normally intended upper end 11x of the device illustrated in FIGURE 7 are formed with the warp laid longitudinally and with the fill laid circumferentially. The normally intended lower end 11y of the device is formed with the warp laid about the circumference of the side support members 10 and 11 and with the fill laid longitudinally. In this manner I obtain the advantages previously described in connection with the device illustrated in FIGURES 5 and 6.

In the modification illustrated in FIGURE 9 it will be noted that the upper intended end of the slide member 18 lies in the plane defined by the longitudinal axes of the side support members 10 and 11. This construction, in effect, causes the inflatable side support members 10 and 11 to become side rails and tends to prevent the accidental falling of the escapee over the side of the slide.

I claim:
1. In a device of the character described, a pair of tubular inflatable side support members, two tubular inflatable end support members joining the ends of said side support members and adapted to hold the same in substantially parallel spaced relationship when they are inflated, a deformable fabric sheet secured along the intended upper edges of said side support members, said tubular inflatable side support members and tubular inflatable end support members being formed of fabric, the intended upper and lower ends of said side support members being formed with the warp of the fabric extending laterally circumferentially around the member and the intermediate portion of said side support members being formed with the warp of the fabric extending longitudinally thereof whereby the rigidity of said intermediate portion exceeds the rigidity of said upper and lower end portions.

2. In a device of the character described, a pair of tubular inflatable side support members, tubular inflatable end support members joining the ends of said side support members and adapted to hold the same in substantially parallel spaced relationship when they are inflated, a deformable fabric sheet secured along the intended upper edges of said side support members presenting a substantially flat surface at its intended upper and lower ends and presenting a sagging surface therebetween, said side support members and end support members being formed of fabric, the intended upper and lower end portions of said side support members being formed with the warp of the fabric extending laterally circumferentially around the member and with the intermediate portions of said side support members being formed with the warp of the fabric extending longitudinally thereof whereby the rigidity of said intermediate portions exceeds the rigidity of said upper and lower end portions.

3. In a device of the character described, a pair of tubular inflatable side support members, tubular inflatable end support members joining the ends of said side support members and adapted to hold the same in substantially parallel spaced relationship when they are inflated, a deformable fabric sheet secured along the intended upper edges of said side support members, said side support members and end support members being formed of fabric, the intended lower ends of said side support members being formed with the warp of the fabric extending laterally around the member and with the remaining upper portions of said side support members being formed with the warp of the fabric extending longitudinally thereof whereby the rigidity of said upper portions exceeds the rigidity of said lower portions.

4. In a method of manufacturing an inflatable escape slide of the type having a pair of tubular inflatable side support members joined at their ends by a pair of tubular inflatable end support members adapted to hold said side support members in substantially parallel spaced relationship when they were inflated comprising forming said tubular inflatable support members of an impregnated fabric and laying the warp of the fabric longitudinally to form the intended upper ends of said side support members and laying the warp of the fabric laterally to form the intended lower ends of said side support members thereby to form the intended upper ends in such a manner that they are stiffer than the intended lower ends.

References Cited in the file of this patent

UNITED STATES PATENTS

| | | |
|---|---|---|
| 2,765,131 | Boyle | Oct. 2, 1956 |
| 2,936,056 | Heyniger | May 10, 1960 |
| 3,018,867 | Heyniger | Jan. 30, 1962 |

FOREIGN PATENTS

| | | |
|---|---|---|
| 580,453 | Canada | July 28, 1959 |